United States Patent
Lee et al.

(10) Patent No.: US 8,250,074 B2
(45) Date of Patent: Aug. 21, 2012

(54) DOCUMENT PROCESSING SYSTEM AND METHOD THEREOF

(75) Inventors: Chia-Hoang Lee, Hsinchu (TW); Zan-Wei Liao, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 76 days.

(21) Appl. No.: 12/904,369

(22) Filed: Oct. 14, 2010

(65) Prior Publication Data
US 2011/0087671 A1 Apr. 14, 2011

(30) Foreign Application Priority Data

Oct. 14, 2009 (TW) .............................. 98134734 A

(51) Int. Cl.
*G06F 17/30* (2006.01)
(52) U.S. Cl. ........ 707/740; 707/706; 707/722; 707/736; 707/737; 707/752; 707/754; 707/755; 707/756; 707/757; 707/759; 707/769; 707/781; 704/9
(58) Field of Classification Search .................. 707/706, 707/722, 736, 737, 741, 748, 752, 754, 755, 707/756, 757, 759, 769, 781, 999.002, 999.006; 704/9
See application file for complete search history.

(56) References Cited

U.S. PATENT DOCUMENTS

| | | | |
|---|---|---|---|
| 5,721,897 A * | 2/1998 | Rubinstein | 1/1 |
| 2002/0078090 A1 * | 6/2002 | Hwang et al. | 707/513 |
| 2005/0216443 A1 * | 9/2005 | Morton et al. | 707/3 |
| 2009/0063473 A1 * | 3/2009 | Van Den Berg et al. | 707/5 |

* cited by examiner

*Primary Examiner* — Syling Yen
(74) *Attorney, Agent, or Firm* — WPAT, P.C.; Anthony King

(57) ABSTRACT

In a document processing system and a document processing method, the document processing method includes the steps of: obtaining a document and dividing the document into a plurality of terms and giving a syntactic index to each of the terms; dividing the document into a plurality of sentences; selecting a key syntactic index from the syntactic indexes, and transforming each of the sentences into a preliminary key terms sequence which includes a preliminary key term corresponding to the key syntactic indexes according to the key syntactic indexes; selectively expanding the preliminary key term of a representative sentence of the document into an advanced key term; and determining at least one core candidate sentence among the sentences to generate a core abstract of the document according to the preliminary key terms and the advanced key term.

9 Claims, 16 Drawing Sheets

3a  3b

Hsieh urges (Nb) reform (VC) calls (VF) young people (Na) to join the party (VH)
Representing (VK) DDP (Nb) participated (VC) president (Na) lost (VH) 's (DE)
Chang-Ting Hsieh (Nb) yesterday (Nd) in (P) Central Standing Committee
Meeting (Nc) before (Ncd) declare (VE) resign (VC) party chairman (Na) ,
(COMMACATEGORY)
He (Nh) also (D) to (P) party affairs (Na) reform (VC) raised (VC) important (VH)
suggest (VE) , (COMMACATEGORY)
He (Nh) urged (VE) overall (A) review party (Nb) 's (DE) structure (Na) ,
(PAUSECATEGORY) nominate (VC) system (Na) and (Caa) direction (Na) ,
(COMMACATEGORY)
Particularly (D) DDP (Nb) many (Neqa) years (Nf) in the past (D) promote (VC) 's
(DE) Taiwan (Nc) entity (Na) conception (Na) has been (D) recognized (VJ)
society (Na) recognition (Na) , (COMMACATEGORY)
Future party (Na) no longer (D) manipulate (VC) Taiwan (Nc) or (Caa) local (Nc) ,
(COMMACATEGORY)
Must (D) and (P) many (Neqa) local (Nc) political party (Na) competition (Na)
 progression (Na) , (COMMACATEGORY)
Showing (VJ) DDP (Nb) progression (VH) values (Na) , (COMMACATEGORY)
Act as (VG) Taiwan (Nc) progression (VH)local (Nc) power (Na) 's (DE)
representative (Na) , (COMMACATEGORY)
Talent (Na) balacne (VA) KMT (Nb) 's (DE) conservative (VH) system (Na) ,
(COMMACATEGORY)
Gradually (D) resume (VHC) power (Na) . (PERIODCATEGORY)
Urged Ma (Na) investigated (VE) 3/19 (Neu) shooting incident (Na)
Hsieh (Nb) also (D) urged (VE) president (Na) successful candidate (Na)
Ying-Jeou Ma (Nb) can (D) carry on (VC) transitional (VH) justice (Na) ,
(PAUSECATEGORY) Keep (VJ) promise (NA) , (COMMACATEGORY)
Continued (VF) investigating (VC) 3/19 (Neu) shooting incident (Na) ,
(PAUSECATEGORY) Wen-Cheng Chen (Nb) and (Caa) Lin's (Nc) murder cases
(Na) etc (Cab) truth (Na) , (COMMACATEGORY)

FIG. 4A

And (Cbb) within (P) a specific (A) time (Na) within (Ncd) announce publicly (VE) , (COMMACATEGORY)
Allow (VL) Taiwan (Nc) society (Na) truly (D) set (VCL) resolution (VA) of (DE) road (Na) . (PERIODCATEGORY)
With regard to (VJ) after losing the election (VH) DDP (Nb) of (DE) reform (VC) , (COMMACATEGORY)
Chang-Ting Hsieh (Nb) urges (VE) calls (VC) interim (A) party representative (Na) meeting (Na) , (COMMACATEGORY)
Allow (VL) reform (VC) of (DE) voice (Na) [ (PARENTHESISCATEGORY) speak (Nb) out (VH) loud (VC) ] ( PARENTHESISCATEGORY) , ( COMMACATEGORY)
Integrate (VHC) people (Na) 's (DE) power (Na) , ( COMMACATEGORY)
Consider (VE) party (Na) 's (DE) future (Nd) position (Na) and (Caa) direction (Na) , ( COMMACATEGORY)
He (Nh) also (D) suggested (VE) in (P) interim (A) party representative (Na) meeting (Na) amend (VC) constitution (Na) and (Caa) staff position (Na) staff (Na) election (Na) method (Na) , (COMMACATEGORY)
Allow (VL) newly (VH) joined (VC) 's (DE) young people (Na) , (COMMACATEGORY)
Can (D) in (P) fifth (Neu) month (Na) party chairman (Na) election (Na) to have (VJ) the right to vote (Na) , ( COMMACATEGORY)
Totally (VH) reform (VC) party (Na) of (DE) structure (Na) . (PERIODCATEGORY)
Chang-Ting Hsieh (Nb) yesterday (b) in (P) Central Standing Committee Meeting (Nc) before (Ncd) declared (VE) resign (VC) party chairman (Na) , ( COMMACATEGORY)
He (Nh) first (D) with (P) Central Standing Committee members (Na) shook hands (VA) greeted (VB) , ( COMMACATEGORY)
And then (Nd) read (VC) in advance (D) prepared (VC) of (DE) script (Na) , ( COMMACATEGORY)
Speech (Na) ended (VHC) after (Ng) left (VA) . ( PERIODCATEGORY)

FIG. 4B

320

Chang-Ting Hsieh representing Democratic Progressive Party (DDP) for the presidential election declared his resignation as chairman of the DDP in the Central Standing Committee Meeting yesterday after he lost the election. —— 3c He raised an important proposal for a reform of the Party.
He urged for an overall review on the structure the nomination system and direction of the Party.
Particularly, the conception of DDP's promoting the entity of Taiwan in past years has been recognized.
Future party no longer manipulated Taiwan or local,
and must compete progression with many local political party competition.
Showing the values of progression and improvement made by DDP,
and representing the local power for the progression of Taiwan
enable to balance the KMT's conservative system
and resume power gradually.
Hsieh urged Ma to investigate the 3/19 shooting incident.
Hsieh also urged the candidate of the presidential election Ying-Jeou Ma to
carry out the transitional justice and keep his promises
to continue investigating the 3/19 shooting incident and the truth of the
Wen-Cheng Chen and Lin's murder cases,
and to make public announcements within a specific time,
so as to set Taiwan on the road to the grand resolution.
With regard to DDP's reform after losing the election,
Chang-Ting Hsieh urged to hold an interim party committee meeting
to allow the voice of reform to "speak out loud"
and integrate the power of the people,
and consider the party's future and direction.
He also suggested changing the constitution and the party committee election system in the interim party committee meeting
to allow young who people newly joining the party
to have the right to vote in the election of Party Chairman in May
and a total reform of the Party's structure.
Chang-Ting Hsieh declared his resignation as Party Chairman in the Central Standing Committee Meeting yesterday,
and greeted and shook hands with Central Standing Committee members
before reading his prepared script,
and then left after the speech ended.

FIG. 5

┌─ 320a
┌─────────────────────────────────────────────────────────┐
│ representing DDP for presidential election lost the election Chang-Ting │
│ Hsieh Central Standing Committee declared resignation ┌──────────────┐ ├─ 34
│                                                       │ party chairman │
└───────────────────────────────────────────────────────┴──────────────┘
Party affairs reform proposal important suggestion
Urged review party structure nomination system direction
DDP promote Taiwan entity conception society recognition
Future party manipulate Taiwan local
Local party competition progression
DDP progression values
Taiwan progression local power represent
Before balance KMT conservative system
Resume power
Urged Ma to investigate
Hsieh urged Ma President candidate Ying-Jeou Ma carry out transitional justice keep his promise
Continue investigating shooting incident Wen-Cheng Chen and Lin's murder cases truth
Time announced publicly
Taiwan society resolution road
After losing the election DDP reform
Chang-Ting Hsieh urged called interim party committee meeting
Reform voice speak out loud
Integrate people power
Consider party position direction
Suggest interim party committee meeting amending constitution committee position member election method
Newly joined young people
Month party chairman election right to vote
Totally reform party structure
Chang-Ting Hsieh interim party committee meeting declared resignation party chairman
Interim party committee meeting shook hands greeted
Read prepared script
Speech ended left

FIG. 6B

36 — Chang-Ting Hsieh representing Democratic Progressive Party (DDP) for the presidential election declared his resignation as chairman of the DDP in the Central Standing Committee Meeting yesterday after he lost the election.
He also raised an important proposal for a reform of the Party. To allow the voice of reform to "speak out loud" and totally reform the Party's structure.

FIG. 8A

37 — Chang-Ting Hsieh representing Democratic Progressive Party (DDP) for the presidential election declared his resignation as chairman of the DDP in the Central Standing Committee Meeting yesterday after he lost the election.
He urged for an overall review on the structure the nomination system and direction of the Party.
Showing the values of progression made by DDP, and representing the local power for the progression of Taiwan enable to balance the KMT's conservative system and resume power gradually.
Hsieh urged Ma to investigate the 3/19 shooting incident.
Chang-Ting Hsieh urged to hold an interim party committee meeting to allow young who people newly joining the party....

FIG. 9A

Chang-Ting Hsieh representing Democratic Progressive Party (DDP) for the presidential election declared his resignation as chairman of the DDP in the Central Standing Committee Meeting yesterday after he lost the election.

He also raised an important proposal for a reform of the Party.

He urged for an overall review on the structure the nomination system and direction of the Party.

Showing the values of progression and improvement made by DDP, to allow the voice of reform to "speak out loud" and totally reform the Party's structure.

FIG. 10A

DOCUMENT PROCESSING SYSTEM AND METHOD THEREOF

BACKGROUND OF THE INVENTION

1. Field of the Invention

The present invention relates to a document processing system and a method thereof, and more particularly to a system and method capable of automatically generating an abstract for a digital document.

2. Description of the Related Art

As digital technology advances and the Internet blooms, information published and disclosed in the Internet rises rapidly, and we can browse or inquire any information through the Internet easily and obtain information and data not only from media such as books, televisions or conversions, and thus saving us the trouble of inquiring or searching for data.

However, the data volume of the Internet is huge, users have to put up lots of efforts to find a desired document or content sometimes, and the level of difficulty for finding the appropriate data is increased. Furthermore, users unconscientiously spend too much time on repeatedly browsing excessive data or digital content with no substantial meaning to the users.

For example, many portal websites provide instant news now and allow users to browse news documents released by different media organizations in a short time. The quantity of such news documents falls within a ranges from hundreds to thousands and has an update of once every several minutes, and the huge quantity of news documents may give rise to an information overload problem. More particularly, many of these news documents come a same news event, whose content may be substantially the same or even identical. Therefore, it is absolutely necessary to find a quick way of processing the digital documents and information to allow users to obtain the required or useful information in the shortest time.

As to the extensive use of search engines, users can an automatic abstract method to search their desired information and determine whether or not to read or access an article according to the content of the abstract in the search process, such that it can expedite the searching speed and reduce the time for users to browse the documents.

SUMMARY OF THE INVENTION

To achieve the foregoing objectives, the present invention adopts the following technical measures and provides a document processing method to overcome the problems of the prior art.

The method in accordance with a preferred embodiment of the present invention comprises the steps of: obtaining a document, dividing the document into a plurality of terms, giving each term a corresponding syntactic index, and dividing the document into a plurality of sentences according to punctuation marks included in the document.

The method further comprises the steps of: selecting a plurality of key syntactic indexes from the syntactic indexes, transforming each preliminary key terms sequence including the preliminary key term corresponding to the key syntactic indexes according to the key syntactic indexes, and further selectively expanding the preliminary key term of the sentence representing the document into an advanced key term, and determining at least one core candidate sentence from the plurality of sentences according to the preliminary key term and the advanced key term to form a core abstract of the document.

Another objective of the present invention is to provide a document processing system to overcome the problems of the prior art.

In a preferred embodiment, the document processing system comprises a receiving module, a first dividing module, a second dividing module, a transforming module, a processing module and a core abstract module.

The receiving module is provided for obtaining a document, and the first dividing module is coupled to the receiving module for dividing the document into a plurality of terms and giving a syntactic index corresponding to each term. In addition, the second dividing module is similarly coupled to the receiving module and provided for dividing the document into a plurality of sentences according to at least one type of punctuation marks contained in the document.

In addition, the transforming module is coupled to the first dividing module and the second dividing module, and provided for selecting a plurality of key syntactic indexes from the syntactic indexes, and transforming the key syntactic indexes into a preliminary key terms sequence according to each sentence of the key syntactic index, wherein each preliminary key terms sequence includes at least one preliminary key term corresponding to the key syntactic index.

In addition, the processing module is coupled to the transforming module and provided for selectively expanding at least one preliminary key term of a representative sentence of the document into an advanced key term. A core abstract module is coupled to the processing module and provided for determining at least one core candidate sentence in the plurality of sentences according to the preliminary key term and the advanced key term to form a core abstract of the document.

In summation, the abstract of the document can be generated efficiently in accordance with the document processing system and method thereof according to the present invention. Particularly, the abstract generated by the document processing system and method thereof according to the present invention accurately contains key points of the document, such that users can determine whether or not to read the document according to the content of the abstract, so as to save the time of browsing documents.

The advantages and technical characteristics of the present invention will become apparent with the detailed description of the invention and the illustration of related drawings as follows.

BRIEF DESCRIPTION OF THE DRAWINGS

FIGS. 4A and 4B show an example of a document of FIG. 1 processed by a first dividing module;

FIG. 5 shows an example of a document of FIG. 1 processed by a second dividing module;

FIG. 6B shows an example of a transforming module that changes a paragraph of a document;

FIG. 8A shows a core abstract generated by a core abstract module of the present invention;

FIG. 9A shows a supplementary abstract generated by a supplementary abstract module of the present invention;

FIG. 10A shows an abstract generated by an abstract module of the present invention.

DETAILED DESCRIPTION OF THE PREFERRED EMBODIMENTS

The technical characteristics and effects of the present invention will be apparent with the detailed description of preferred embodiment together with the illustration of related drawings as follows.

The present invention provides a document processing system and method thereof for generating an abstract of a document automatically. Preferred embodiments of the document processing system and method thereof in accordance with the present invention are disclosed as follows.

Figure 1:
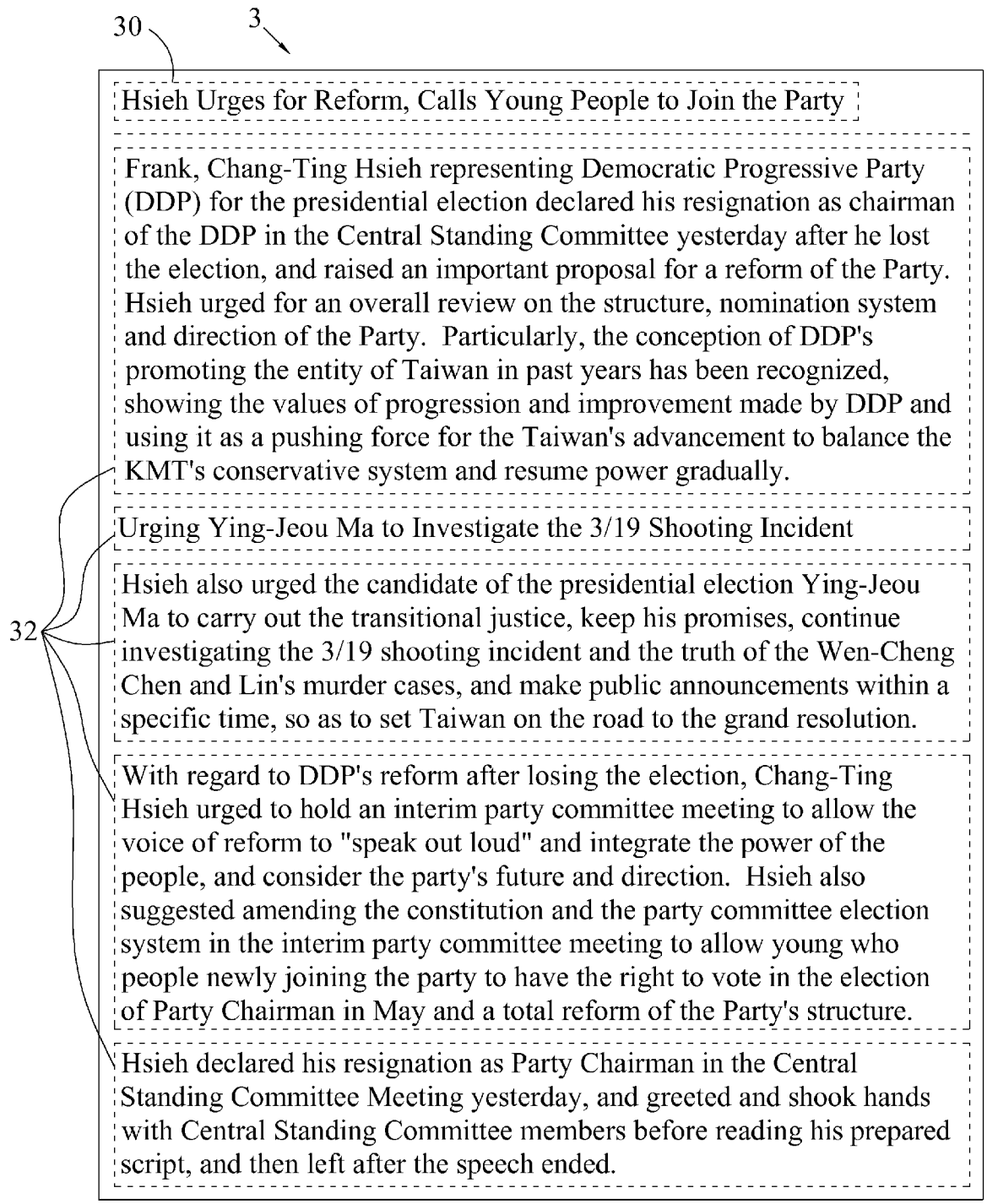
FIG. 1 shows an example of a document.
Figure 2:
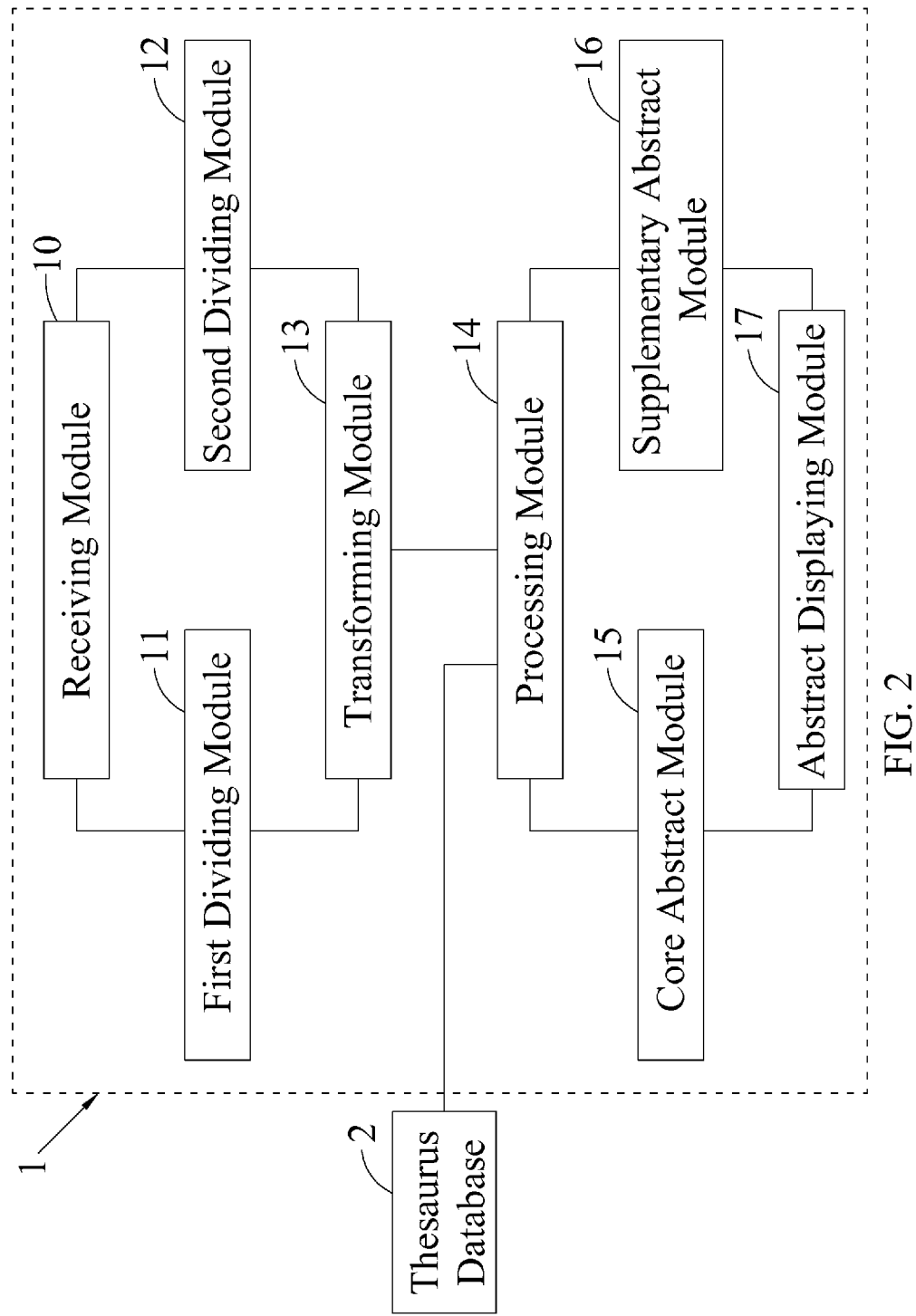
FIG. 2 is a functional block diagram of a document processing system in accordance with a preferred embodiment of the present invention.
Figure 3:
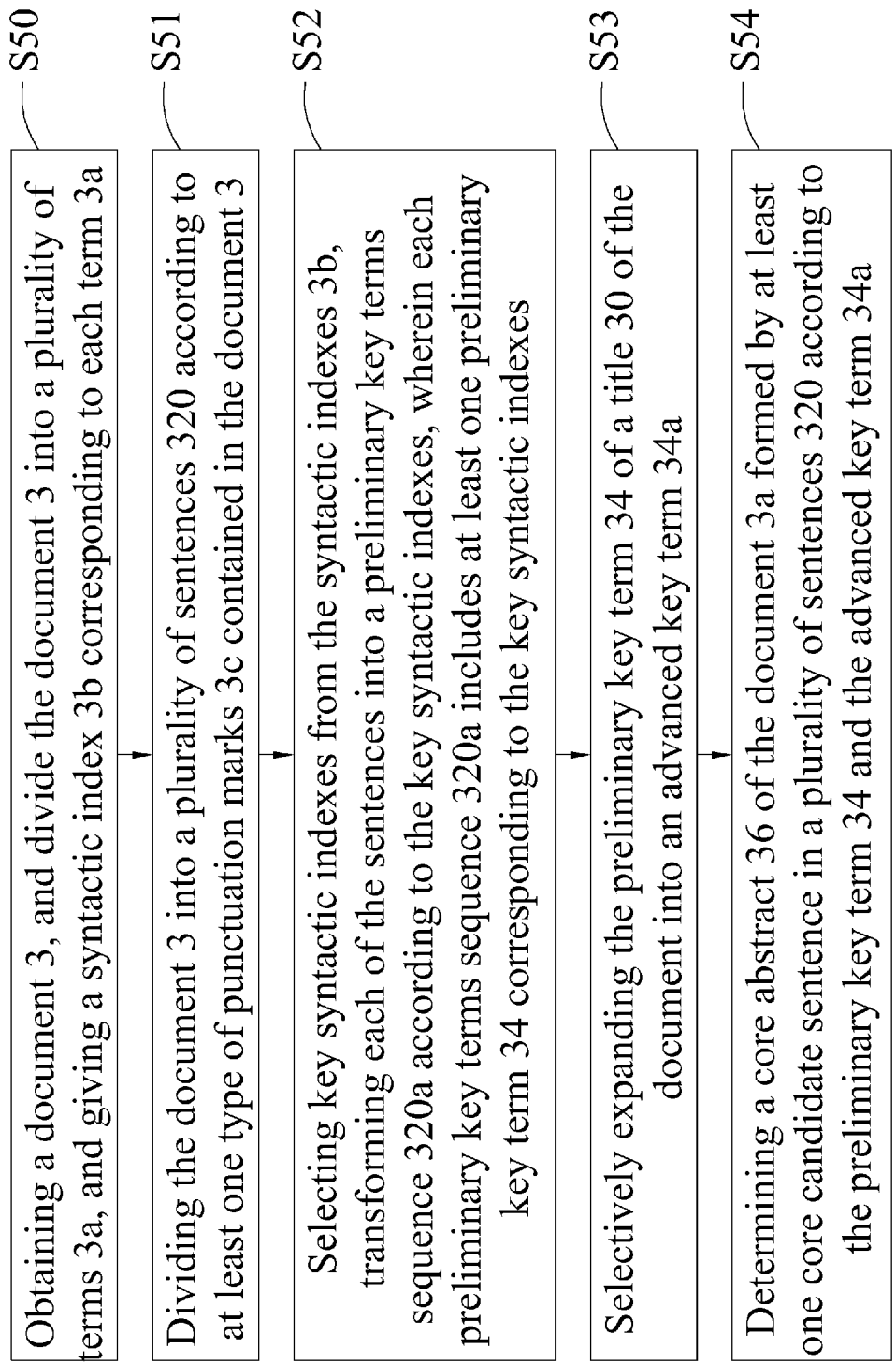
FIG. 3 is a flow chart of a document processing method in accordance with a preferred embodiment of the present invention.

With reference to FIGS. 1 to 3, FIG. 1 shows an example of a document; FIG. 2 shows a functional block diagram of a document processing system in accordance with a preferred embodiment of the present invention; and FIG. 3 shows a flow chart of a document processing method in accordance with a preferred embodiment of the present invention.

In FIG. 2, the document processing system 1 of the present invention comprises a receiving module 10, a first dividing module 11, a second dividing module 12, a transforming module 13, a processing module 14, a core abstract module 15, a supplementary abstract module 16 and abstract displaying module 17.

From the network, the receiving module 10 can receive a document 3 obtained in the storage device or inputted by a user as shown in FIG. 1. In a preferred embodiment, the document 3 includes a title 30 and a plurality of paragraphs 32. In another preferred embodiment, the document 3 just includes a plurality of paragraphs 32.

With reference to FIG. 4 for an example of a document of FIG. 1 processed by a first dividing module 11, the first dividing module 11 of this preferred embodiment is coupled to the receiving module 10 and provided for dividing the document 3 into a plurality of terms 3a and giving a syntactic index 3b corresponding to each term 3a (as shown in Step S50 of FIG. 3). For example, the syntactic indexes of the terms "Society", "People", "Method" and "Route" are "Common Nouns (Na)", and the syntactic indexes of the terms "Propose", "Set" and "Quit" are "Active Transitive Verb (Vc)".

With reference to FIG. 5 for an example showing a document of FIG. 1 processed by a second dividing module 12, the second dividing module 12 of this preferred embodiment is coupled to the receiving module 10 and provided for dividing the document 3 into a plurality of sentences 320 according to at least one type of punctuation marks 3c contained in the document 3 (as shown in Step S51 of FIG. 3). In this preferred embodiment, the second dividing module 12 divides the document 3 according to a punctuation mark 3c such as a comma, a semicolon, a period, a question mark, and an exclamation mark. In actual practice, the second dividing module 12 can also divide a sentence according to other appropriate punctuation marks.

Figure 6A:
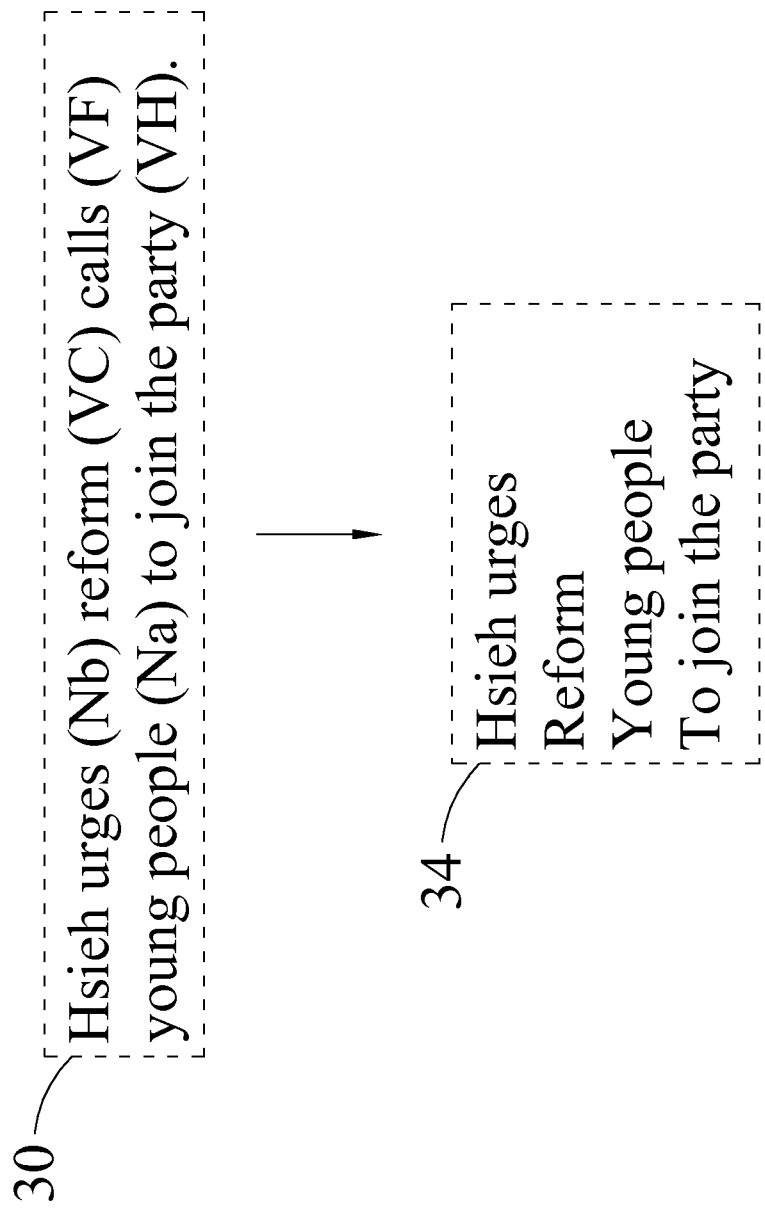
FIG. 6A shows an example of a transforming module that changes a title of a document.

The transforming module 13 is coupled to the first dividing module 11 and the second dividing module 12 and provided for selecting a plurality of key syntactic indexes from the syntactic indexes. The following table shows the selected key syntactic indexes used in this preferred embodiment. It is noteworthy to point out that other syntactic indexes can be selected as the key syntactic indexes if needed in actual practices. With reference to FIG. 6A for an example of a transforming module 13 that transforms a title of a document, the transforming module 13 transforms title 30 of the document 3 into a plurality of preliminary key terms 34 according to the key syntactic indexes as listed in Table 1 and deletes the terms unrelated to the key syntactic indexes as listed in Table 1 (Step S52 of FIG. 3). The foregoing step applies the concept of compression to keep the terms related to the key syntactic indexes and deletes all terms unrelated to the key syntactic indexes in a paragraph. The more the key syntactic indexes, the less is the number of compressions, and vice versa.

With reference to FIG. 6B for an example showing a transforming module 13 that transforms a paragraph of a document, the transforming module 13 further transforms each sentence 320 contained in a paragraph 32 of a document 3 (as shown in FIG. 5) into a preliminary key terms sequence 320a (as shown in FIG. 6B) according to the key syntactic indexes listed in Table 1, and each preliminary key terms sequence 320a includes a preliminary key term 34 corresponding to the key syntactic index. The transformation removes some stop words in the original sentence and only keeps the important portion of key words.

TABLE 1

| Key Syntactic Index | Meaning of Syntactic Index |
| --- | --- |
| Na | Common Noun |
| Nb | Proper Noun |
| Nc | Place Noun |
| VA | Active Intransitive Verb |
| VB | Active Pseudo-transitive Verb |
| VC | Active Transitive Verb |
| VE | Active Verb with a Sequential Object |
| VH | Stative Intransitive Verb |
| VHC | Stative Causative Verb |
| VK | Stative Verb with a Sentential Object |

Based on the structure and writing style of Chinese, the author often uses abbreviations or pronouns in the title to summarize the key points of the document by reduced and simplified words. To have a complete set of preliminary key terms 34 of the title 32, the processing module 14 of the present invention is used for expanding the preliminary key term 34 into an advanced key term.

Figure 7A:
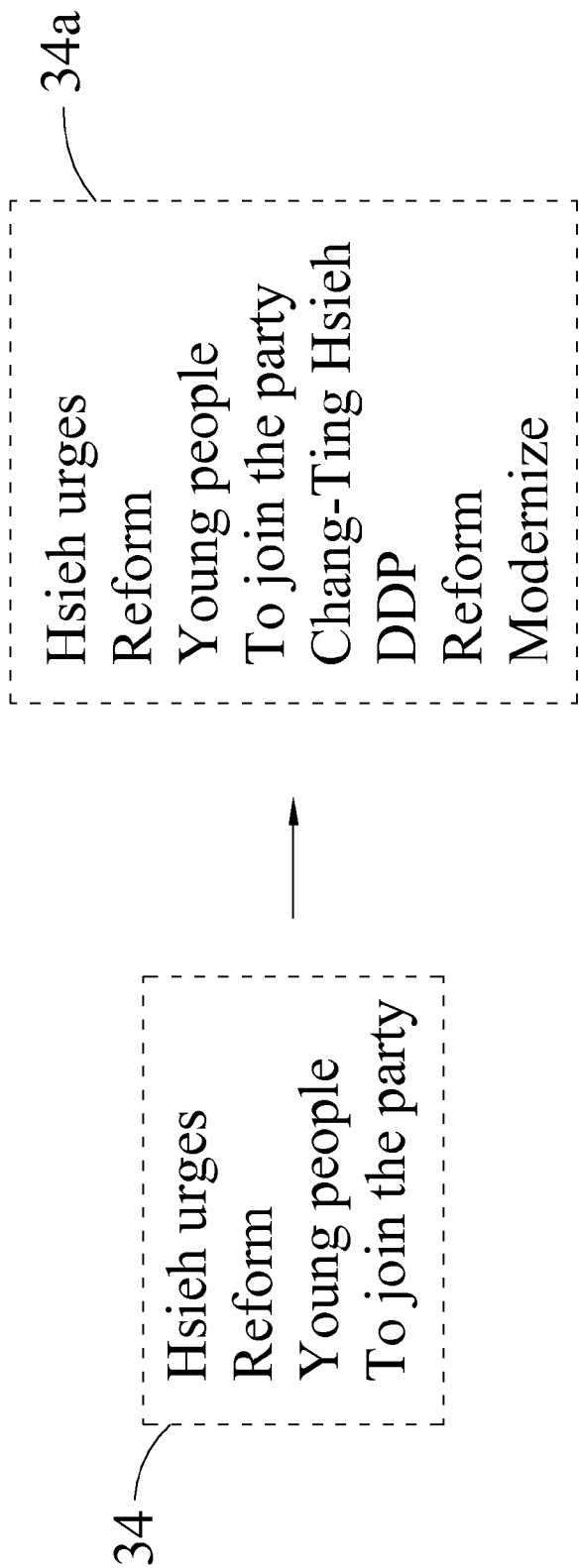
FIG. 7A shows a processing module that expands a preliminary key term into an advanced key term.

With reference to FIG. 7A for an example of a processing module that expands a preliminary key term into an advanced key term, the processing module 14 is coupled to the transforming module 13 for selectively expanding the preliminary key term 34 of a representative sentence (which is the title 30 in this preferred embodiment) of the document 3 into an advanced key term 34a (Step S53), and the expansion mainly finds other terms similar to a preliminary key term 34 of the representative sentence in the document and finds and expands synonyms according to a thesaurus database into an advanced key term 34a.

In actual practices, if the document does not include a title, the representative sentence can be changed to the first sentence and/or last sentence of each paragraph or a sentence selected by other methods.

Figure 7B:
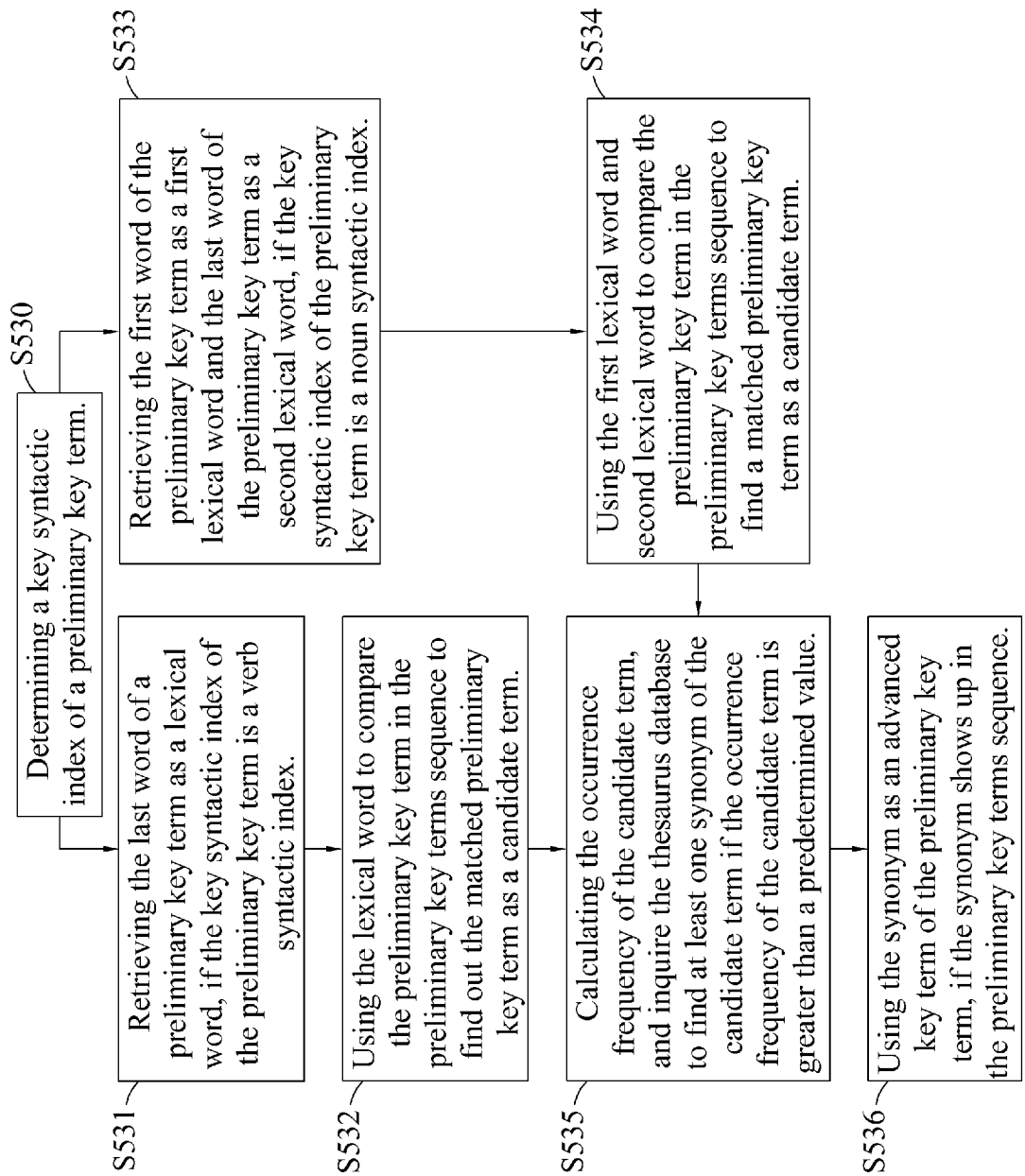
FIG. 7B is a flow chart of an expansion process of a processing module in accordance with a key syntactic index of a preliminary key term into an advanced key term.

In actual practices, the step S53 as shown in FIG. 3 is further divided into the following steps. With reference to FIG. 7B for a flow chart of expanding a key syntactic index according to a preliminary key term by a processing module 14, the processing module 14 determines a key syntactic index of a preliminary key term (Step S530), and the processing module 14 retrieves a preliminary key term (such as the last word "Party" of the term "Join the party" as a lexical word (Step S531) if the key syntactic index of the preliminary key term 34 is a verb syntactic index listed in Table 1, and then the lexical word is used for comparing the preliminary key term 34 in one of the preliminary key terms sequences 320 as shown in FIG. 6B to find out the matched preliminary key term 34 as a candidate term (such as the preliminary key term containing "Party" which is "Democratic Progressive Party") (Step S532), and an occurrence frequency of the candidate term in the document 3 is calculated, and the candidate term is kept if the occurrence frequency is greater than a predetermined value.

If the key syntactic index of the preliminary key term 34 is a noun syntactic index listed in Table 1, the processing module 14 retrieves the preliminary key term (such as the first word "Hsieh" of the term "Hsieh's urge") as a first lexical word and the last word "Urge" of the preliminary key term as a second lexical word (Step S533). The first lexical word and second lexical word are used for comparing the preliminary key term 34 in one of the preliminary key terms sequences 320 as shown in FIG. 6B to find a matched preliminary key term 34 as a candidate term (such as the preliminary key term including "Hsieh" which is "Chang-Ting Hsieh") (Step S534).

The processing module 14 as shown in FIG. 2 is further coupled to a thesaurus database 2, and the candidate term is used for inquiring the thesaurus database 2 to find at least one synonym of the candidate term (Step S535). For example, using "Reform" to inquire the thesaurus database 2 will give the results of "Improve", "Enhance", "Transform", "Renew", and "Modernize", etc, and the synonym. processing module 14 further compares these synonyms with a preliminary key terms sequence 320 of a paragraph 32 to determine whether or not the synonyms show up in the preliminary key terms sequences 320a; if yes, then the synonym is an advanced key term 34a of the preliminary key term 34 (Step S536).

Figure 8B:
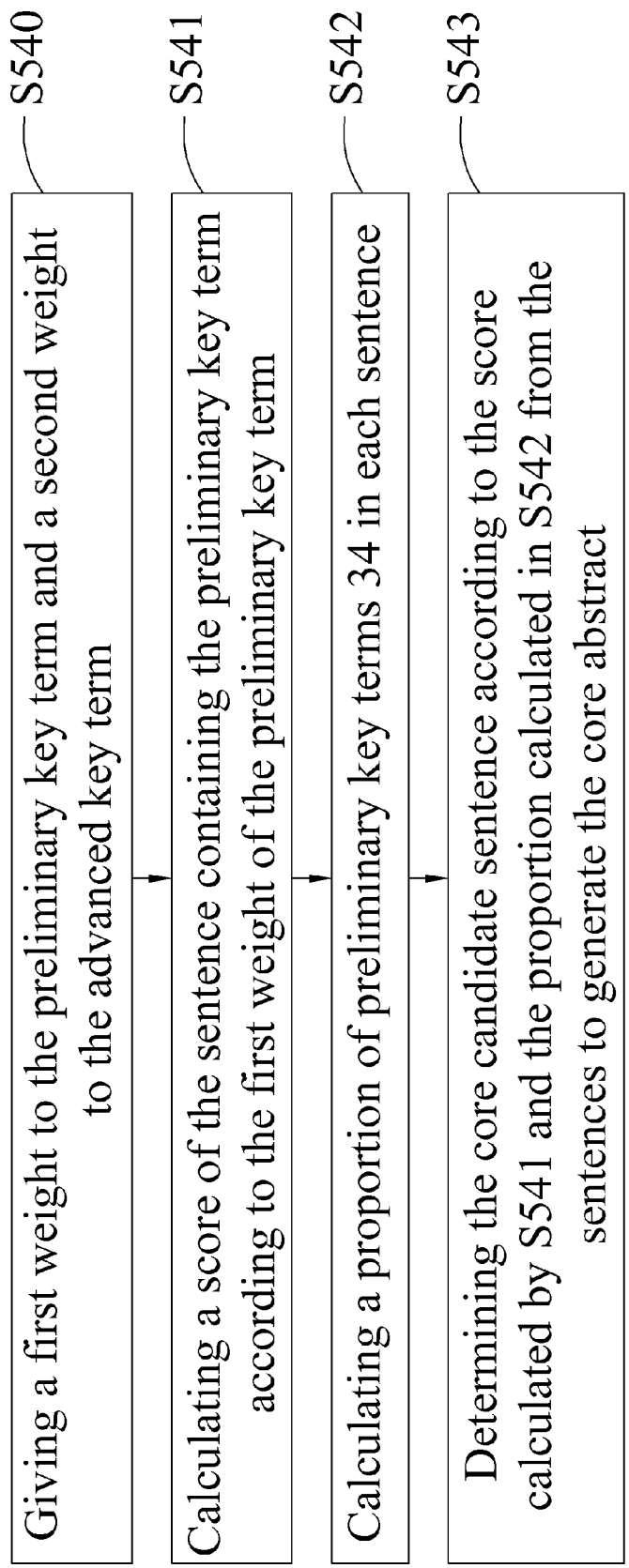
FIG. 8B is a flow chart of a core abstract generated by a core abstract module.

With reference to FIGS. 8A and 8B for a core abstract 36 generated by a core abstract module 15 in accordance with the present invention and a flow chart of generating a core abstract by a core abstract module respectively, the core abstract module 15 is coupled to the processing module 14, for generating a core abstract of a document 3 according to the preliminary key term 34 and advanced key term 34a. In this preferred embodiment, the core abstract module 15 determines a core abstract 36 of the document 3a formed by at least one core candidate sentence in a plurality of sentences 320 according to the preliminary key term 34 and the advanced key term 34a (Step S54).

In the flow of generating the core abstract 36 as shown in FIG. 8B, the core abstract module 15 gives a first weight to the preliminary key term 34 and a second weight to the advanced key term 34a, wherein the first weight is not equal to the second weight (Step S540). For example, the ratio of first weight:second weight=2:1. The core abstract module 15 calculates a score of the sentence containing the preliminary key term 34 according to the first weight of the preliminary key term 34 (Step S541). In actual practices, each sentence is transformed into a preliminary key terms sequence, so that the quantity of preliminary key terms contained in each preliminary key terms sequence is multiplied by the first weight to give the score of the sentence (For example, if the preliminary key terms sequence of a certain sentence includes five key terms and three of the five key terms are preliminary key terms, then the score of the sentence is 3×2=6); if the score of the sentence is greater than a predetermined value then the sentence is selected and included in a core abstract. In another preferred embodiment, a proportion of preliminary key terms 34 in each sentence is calculated in addition to the calculation of the score of the sentence (Step S542) (For example, if the preliminary key terms sequence of a certain sentence includes five key terms and one of the five key terms is a preliminary key term, then the proportion of preliminary key term in the sentence is 1/5). If the proportion is greater than a specific value such as 1/4, then the sentence is considered as a sentence with less information and will be deleted. Finally, the remained sentences are combined to form a core abstract 36 as shown in FIG. 8 (Step S543).

In other words, the flow of generating the core abstract in actual practices only includes Step S541, and the core abstract module selects sentence with a higher score (such as ten sentences with the top ten scores) according to the score of each sentence to generate the core abstract.

Figure 9B:
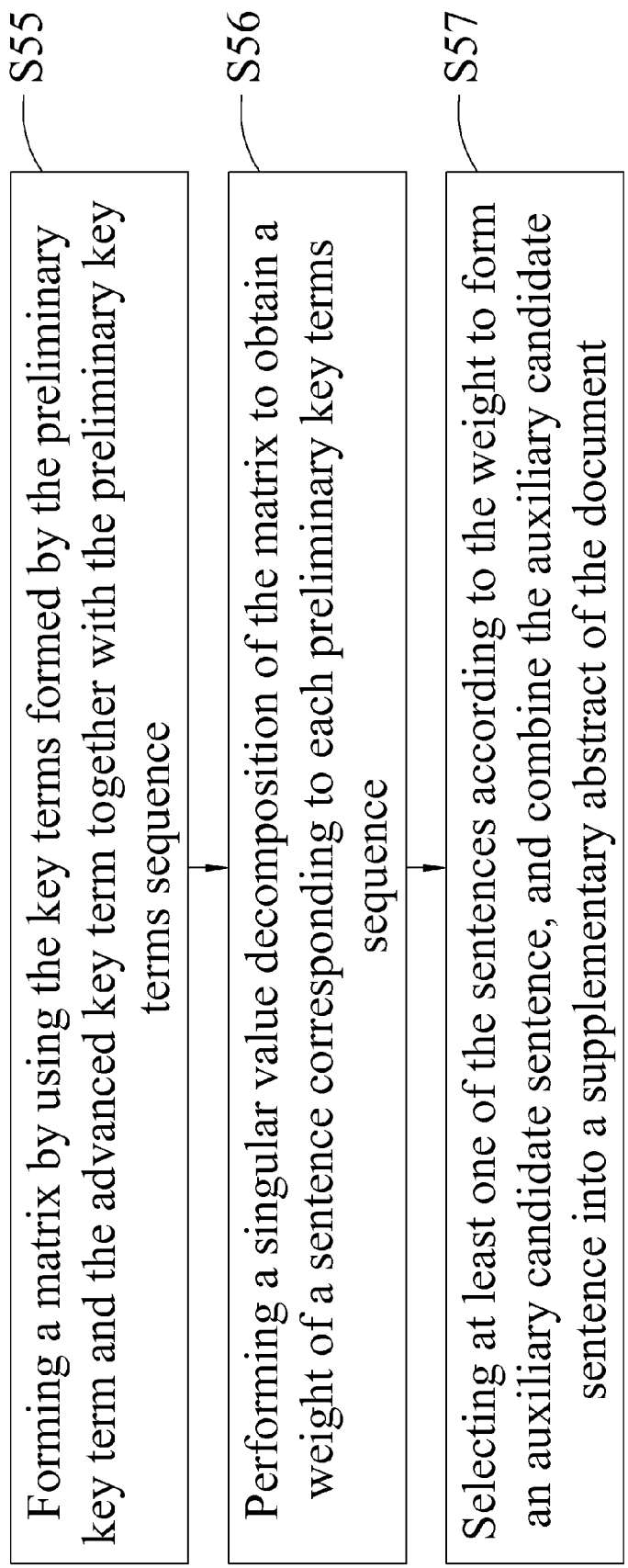
FIG. 9B is a flow chart of a supplementary abstract generated by a supplementary abstract module of the present invention.

With reference to FIGS. 9A and 9B for of a supplementary abstract 37 generated by a supplementary abstract module 16 in accordance with the present invention and a flow chart of generating a supplementary abstract by a supplementary abstract module respectively, the supplementary abstract module 16 is coupled to the transforming module 13 and the processing module 14, and the supplementary abstract module 16 forms a matrix by using the key terms formed by the preliminary key term 34 and the advanced key term 34a together with the preliminary key terms sequence 320 (Step S55). A singular value decomposition of the matrix is performed to obtain a weight of a sentence corresponding to each preliminary key terms sequence (Step S56), and at least one of the sentences is selected according to the weight to form an auxiliary candidate sentence, and the auxiliary candidate sentence is combined into a supplementary abstract 37 of the document (Step S57). It is noteworthy to point out that the supplementary abstract module 16 and supplementary abstract 37 are not absolutely necessary in actual practices, and they are added into the supplementary abstract 37 in accordance with the method of the present invention as needed.

As to the ways of forming the matrix and performing the singular value decomposition, a journal entitled "Generic text summarization using relevance measure and latent semantic analysis" by Y. Gong, and X. Li (in Proc. ACM SIGIR Conference on R&D in Information Retrieval, pp. 19-25, 2001) was published in 2001, and the journal is included here.

Figure 10B:
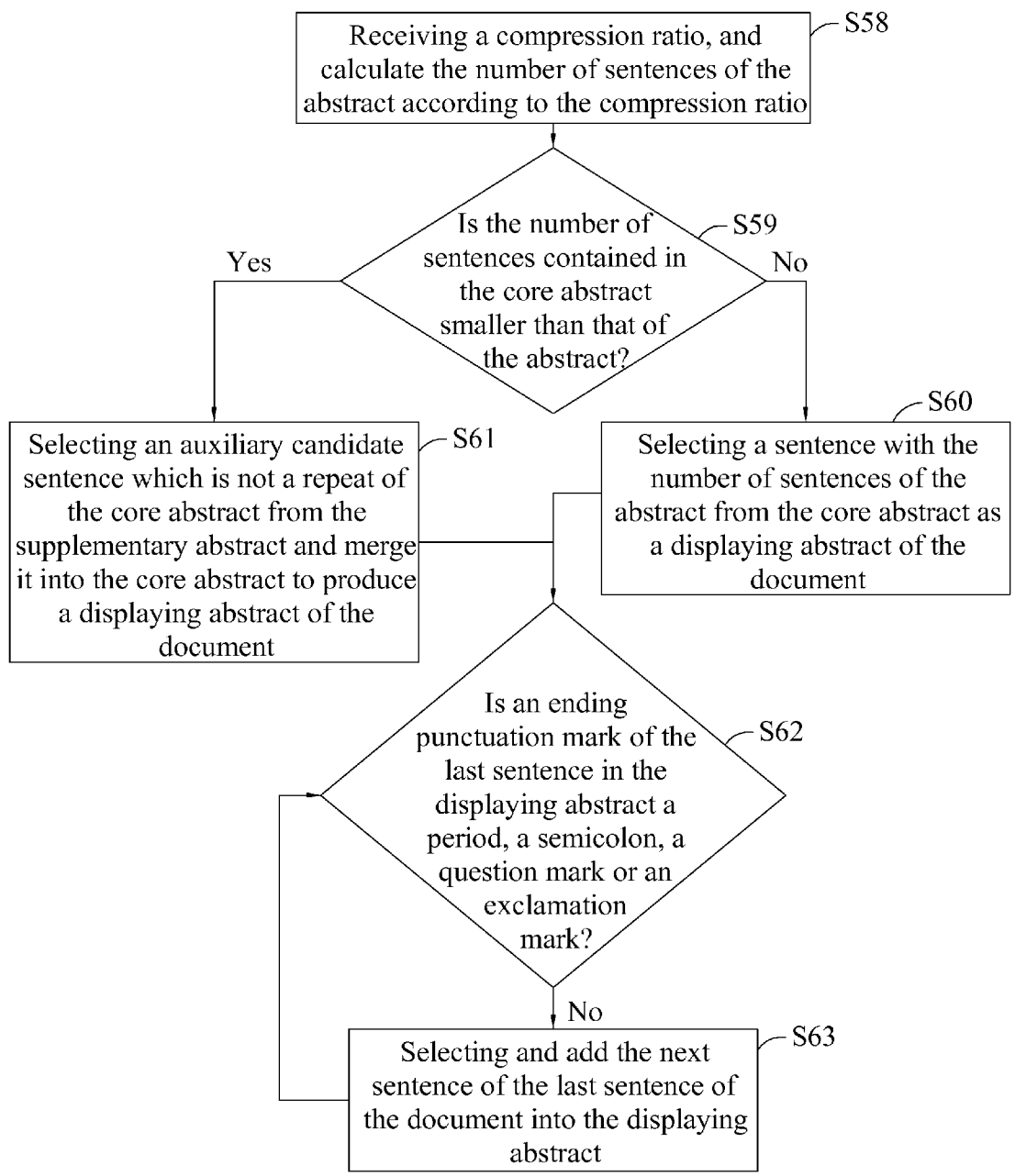
FIG. 10B is a flow chart of an abstract generated by an abstract module.

With reference to FIGS. 10A and 10B, FIG. 10A for a displaying abstract 38 generated by the abstract displaying module 17 of the present invention and a flow chart of generating a displaying abstract by an abstract displaying module respectively, the abstract displaying module 17 is coupled to the core abstract module 15 (both core abstract module 15 and supplementary abstract module 16 can be coupled in accordance with another preferred embodiment), and the abstract module 17 selects a number of sentences required for the abstract from the core abstract, or a number of sentences required for the abstract from the core abstract and the supplementary abstract. The number of sentences of the abstract can be preset in a range such as 5~10 sentences. The number of sentences of the abstract can be set by the compression ratio (such as 15%) of the document 3 received by the abstract module 17 and calculated according to the compression ratio (Step S58). In actual practices, the compression ratio can be preset in the system, or set by a provider of the document 3 or a user viewing the abstract.

To increase the number of sentences of the abstract in accordance with another preferred embodiment, the abstract displaying module 17 determines whether or not the number of sentences contained in the core abstract is smaller than the number of sentences of the abstract (Step S59). If no, then a sentence with the number of sentences of the abstract is selected from the core abstract 36 as a displaying abstract 38 of the document (Step S60). On the contrary, if the number of sentences contained in the core abstract is smaller than the number of sentences of the abstract, then an auxiliary candidate sentence which is not a repeat of the core abstract 36 is selected from the supplementary abstract 37 and merged into the core abstract 36 to produce a displaying abstract 38 of the document (Step S61). It is noteworthy to point out that Steps S59 to Step S61 are not absolutely necessary in actual practices.

To increase the readability of the abstract, the abstract displaying module 17 further processes the ending of a sentence of the integrated displaying abstract. For example, the abstract displaying module 17 further determines whether an ending punctuation mark of the last sentence in the displaying abstract is a period, a semicolon, a question mark or an exclamation mark (Step S62). If no, then a next sentence of the last sentence of the document is selected and added into the displaying abstract, and the determination process is repeated (Step S63).

In actual practices, the document processing system 1 of the present invention further comprises a displaying module coupled to the abstract displaying module 17 for receiving and displaying the displaying abstract. In addition, the displaying module can display an operating interface provided for users to enter an article, a compression ratio or any other parameter of an abstract automatically.

In summation, the document processing system and method thereof according to the present invention can generate an abstract of a document efficiently. Particularly, The abstract generated by the document processing system and method thereof according to the present invention provides key points of the document, such that users can determine or not to read the document according to the content of the abstract, so as to save the user's time of browsing documents.

The document processing system and method thereof according to the present invention can work together with a search engine, such that if a user inquires a keyword through the search engine, the search engine creates an abstract of a resulted webpage by the document processing method of the present invention and shows the displaying abstract together with the searched result to the user.

While the invention has been described by means of specific embodiments, numerous modifications and variations could be made thereto by those generally skilled in the art without departing from the scope and spirit of the invention set forth in the claims.

What is claimed is:

1. A document processing method, comprising the steps of:
    (a) obtaining a document, dividing the document into a plurality of terms, and giving a syntactic index to each of the terms;
    (b) dividing the document into a plurality of sentences according to at least one type of punctuation marks contained in the document;
    (c) selecting a plurality of key syntactic indexes from the syntactic indexes, transforming each of the sentences into a preliminary key terms sequence according to the key syntactic indexes, wherein each preliminary key terms sequence includes at least one preliminary key term corresponding to the key syntactic indexes;
    (d) selectively expanding the at least one preliminary key term of a representative sentence of the document into an advanced key term;
    (e) determining at least one core candidate sentence from the plurality of sentences according to the preliminary key term and the advanced key term to form a core abstract of the document;
    (f) forming a matrix by a key term of the preliminary key term and the advanced key term and the preliminary key terms sequence of the Step (c);
    (g) performing a singular value decomposition of the matrix to obtain a weight of the sentence corresponding to each preliminary key terms sequence;
    (h) selecting at least one of the sentences as an auxiliary candidate sentence according to the weight, and combining the at least one auxiliary candidate sentence into a supplementary abstract of the document;
    (i) receiving a compression ratio, and calculating the number of sentences in an abstract according to the compression ratio;
    (i) determining whether or not the number of sentences contained in the core abstract is smaller then the number of sentences of the abstract;
    (k) selecting the sentence from the core abstract having the number of sentences of the abstract as a displaying abstract of the document, if the determination of Step (i) is negative; and
    (l) selecting and merging the auxiliary candidate sentence which is not a repeat of the core abstract from the supplementary abstract into the core abstract to form the displaying abstract of the document if the determination of Step (i) is affirmative.

2. The document processing method of claim 1, wherein the syntactic index is one selected from the collection of a common noun syntactic index, a proper noun syntactic index, a place noun syntactic index, an active intransitive verb syntactic index, an active pseudo-transitive verb syntactic index, an active transitive verb syntactic index, an active verb with a sequential object syntactic index, a stative intransitive object syntactic index, a stative causative verb syntactic index and a stative object with a sequential object syntactic index.

3. The document processing method of claim 1, wherein the representative sentence is a title of the document.

4. The document processing method of claim 1, wherein the document includes at least one paragraph, and the representative sentence the first sentence and/or the last sentence of the at least one paragraph.

5. The document processing method of claim 1, wherein the Step (d) further comprises the steps of:
    (d1) determining the key syntactic index of the preliminary key term;
    (d2) retrieving the last word of the preliminary key term as a lexical word, if the key syntactic index is a verb syntactic index;
    (d3) using the lexical word to compare and match the preliminary key terms of the preliminary key terms sequence to form a candidate term;
    (d4) calculating an occurrence frequency of the candidate term in the document, and using the candidate term to inquire a thesaurus database to find at least one synonym of the candidate term, if the occurrence frequency is greater than a predetermined value; and
    (d5) determining whether or not the at least one synonym shows up in the preliminary key terms sequence, and using the at least one synonym as the advanced key term of the preliminary key term if the at least one synonym shows up in the preliminary key terms sequence.

6. The document processing method of claim 5, further comprising the steps of:
- (d2') retrieving the first word of the preliminary key term as a first lexical word and the last word of the preliminary key term as a second lexical word, if the key syntactic index of the preliminary key term is a noun syntactic index; and
- (d3') using the first lexical word and the second lexical word to compare the preliminary key terms of the preliminary key terms sequence respectively to find and match the candidate term.

7. The document processing method of claim 1, wherein the Step (e) further comprises the steps of:
- (e1) giving a first weight and a second weight to the preliminary key term and the advanced key term respectively;
- (e2) calculating a score of the preliminary key terms sequence containing the preliminary key term according to the first weight, and then calculating a score of a sentence containing the preliminary key terms sequence according to the score of the preliminary key terms sequence, and selecting a plurality of sentences according to the calculated score of each sentence; and
- (e3) combining at least one of the selected sentences into the core abstract.

8. The document processing method of claim 7, further comprising the steps of:
- (e21) calculating a proportion of the preliminary key term in each the sentence; and
- (e31) picking the preliminary key term with a lower proportion in the sentence as the core candidate sentence to form the core abstract.

9. The document processing method of claim 1, further comprising the steps of:
- (m) determining whether an ending punctuation mark of the last sentence in the displaying abstract is a period, a semicolon, a question mark or an exclamation mark; and
- (n) selecting and adding a next sentence of the last sentence in the document into the displaying abstract if the determination of Step (m) is negative, and repeating Step (m).

* * * * *